United States Patent [19]

Yamaguchi

[11] 4,252,758
[45] Feb. 24, 1981

[54] METHOD OF PRODUCING A SINTERED CHROMIUM OXIDE BODY

[76] Inventor: Akira Yamaguchi, 74-9, 1864-7, Shiroyma-cho, Kasugai-shi, Aichi-ken, Japan

[21] Appl. No.: 20,327

[22] Filed: Mar. 14, 1979

[51] Int. Cl.³ .............................................. F27B 9/04
[52] U.S. Cl. ...................................... 264/57; 264/65; 264/332; 423/607
[58] Field of Search ................. 423/607; 252/62.51 C; 264/65, 66, 57, 332, 319

[56] References Cited

U.S. PATENT DOCUMENTS

| | | | |
|---|---|---|---|
| 3,726,714 | 4/1973 | Haines | 252/62.51 C |
| 3,829,541 | 8/1974 | Farrington et al. | 264/66 |
| 3,843,403 | 10/1974 | Haines | 252/62.51 C |
| 3,911,095 | 10/1975 | Montiglio et al. | 423/607 |
| 4,054,627 | 10/1977 | Ownby | 264/65 |

Primary Examiner—Donald J. Arnold
Attorney, Agent, or Firm—Armstrong, Nikaido, Marmelstein & Kubovcik

[57] ABSTRACT

A sintered, polycrystalline and fully dense chromium oxide body is prepared by heating a $Cr_2O_3$ powder compact at relatively low temperature on condition that a liquid of low-melting chromium oxide compound is formed partially in the compact during heating. In practice the compact buried in carbon powder is heated above 1350° C. The porosity of the sintered body is controlled by changing the proportion of the amount of coarse particles and fine particles in the starting $Cr_2O_3$ powder. A sintered and crack-free body with uniform microstructure and without abnormal grain growth of $Cr_2O_3$ is obtained by the sintering of $Cr_2O_3$ powder compact with Cr metal powder.

5 Claims, 9 Drawing Figures $25\mu$
X1000

$25\mu$
X1000

METHOD OF PRODUCING A SINTERED CHROMIUM OXIDE BODY

FIELD OF INVENTION

This invention relates to a method of producing a sintered body consisting substantially of chromium sesquioxide ($Cr_2O_3$).

BACKGROUND OF THE INVENTION

When a $Cr_2O_3$ powder compact was heated at high temperature in air, a dense sinterd body could not be obtained. Therefore, the compact has been sintered by adding a small amount of metal oxide such as $TiO_2$, $SiO_2$, $Al_2O_3$ or $MgO$. These additives form a liquid phase in $Cr_2O_3$ grain boundaries during heating and promote densification of the compact.

A chromium oxide refractory brick produced by this method containes more than 20% of porosity, and has some drawbacks in use in a glass melting furnace; it is subjected to corrosion by molten glass, and tends to generate pores in molten glass and to vaporize at high temperature.

Chromium has many oxidation states, 2+, 3+, 4+ and 6+ and readily changes at elevated temperatures from one to the other depending on the environment. In heating in an oxidizing atmosphere $Cr_2O_3$ has a strong tendency to react with oxygen to form more volatile oxide such as $CrO_3$. This explaines why a dense body cannot be obtained by sintering in air.

P. D. Ownby et al. have reported that $Cr_2O_3$ powder compact could be sintered to almost theoretical density at 1600° C. at $PO_2 = 2 \times 10^{-12}$ atm. which was controlled using a $CO/CO_2$ buffer system. (P. D. Ownby and G. E. Jungquist, J.Amer.Ceram.Soc., 53 [9] 433–36 (1972).)

Since it is difficult to control on an industrial scale, the sintering atmosphere with CO and $CO_2$ gases at high temperature, chromium oxide refractory brick produced using this atmosphere control method has not been utilized yet.

It is an object of the invention to provide an industrially simple method for producing a highly pure and fully dense $Cr_2O_3$ body.

Another object of the invention is to provide a method for producing a $Cr_2O_3$ body with desired porosity.

A further object of the invention is to provide an economical, crack-free and microstructurally uniform sintered body in an industrial scale.

BRIEF SUMMARY OF THE INVENTION

The method of producing the $Cr_2O_3$ body presented in this invention is characterized by the formation of a liquid of low-melting chromium oxide(s) compound in the $Cr_2O_3$ compact during heating. The liquid phase is formed at relatively low temperature and promotes the densification of the compact. The low-melting chromium oxide compound may be added in starting powder, but they also can be formed in the compact by control of the sintering atmosphere.

In practice, the dense body is obtained by heating the $Cr_2O_3$ compact buried in carbon powder. In this case it is effective to sinter on condition that thin layer of chromium carbide is formed on the surface of the compact during heating. This method can be also used to improve quality of *commercial* sintered chromium oxide body. (sintered chromium oxide body being on the market)

The porosity of sintered body is controlled by changing the proportion of the amount of coarse particles and fine particles in the starting $Cr_2O_3$ powder. The desired coarse particles can be practically produced by heating commercial fine $Cr_2O_3$ powder above 1000° C. in air.

Moreover, the sintered body with uniform microstructure and without abnormal grain growth of $Cr_2O_3$ is obtained from the sintering of a $Cr_2O_3$ compact with Cr metal powder.

Other and further objects, features and advantages of the invention will be appeared more fully from the following description.

DETAILED DESCRIPTION OF THE PREFERRED EMBODIMENT

The method taken in this invention was to promote function sintering by forming a liquid of low-melting chromium oxide compound(s) in a chromium oxide compact. This is clearly explained in the following examples where a chromium oxide powder compact or a chromium oxide sintered body denotes the compact or the body i.e. essentially composed of $Cr_2O_3$.

EXAMPLE 1

Figure 1:
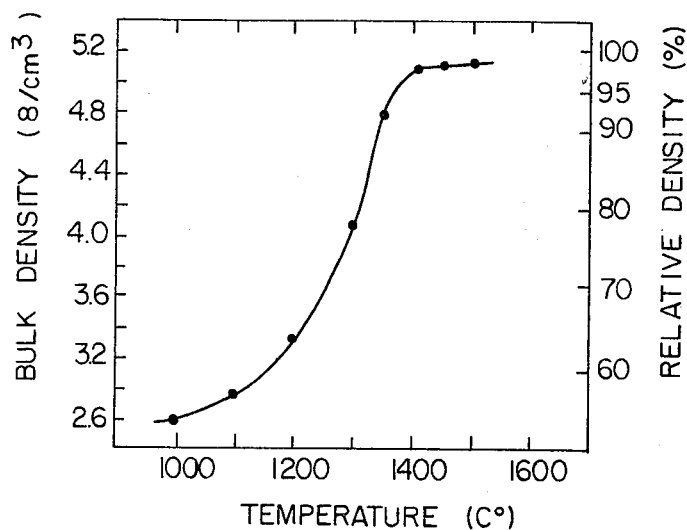
FIG. 1 shows both bulk and relative densities of the $Cr_2O_3$ powder compacts heated for 2 hrs. in carbon powder as a function of heating temperature.

Commercial $Cr_2O_3$ powder ($Cr_2O_3$:99.95%, particle size:0.2–1.0 μm, average particle size:0.5 μm) was pressed at $lt/cm^2$ into columnar compacts of 20 mm in diameter and 10 mm thick. The compacts were placed in alumina crucibles. Each crucible was filled up with carbon powder, closed with a lid, put into a furnace and heated at various temperatures for 2 hrs. After heating, a thin layer of chromium carbide, which is readily taken off, had been formed on the surface of obtained bodies. This was removed before testing. FIG. 1 shows the changes of bulk density and relative density versus sintering temperature. The density of sintered body increased up to almost theoretical density at above 1400° C. and attained to 5.15 g/cm³ (99% of theoretical) at 1500° C., whereas the density of body sintered in air at 1500° C. for 12 hrs. was 3.40 g/cm³, i.e. only 65% of the theoretical value. It is concluded that the sintering of chromium oxide compact was greatly promoted by burying the compact in carbon powder.

Figure 2:
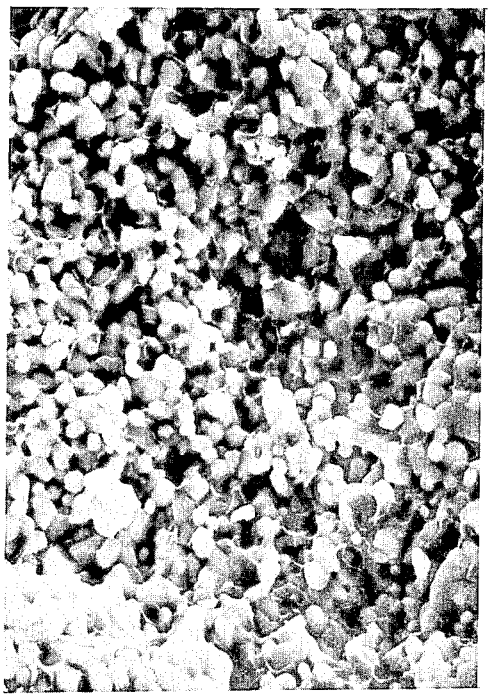
FIG. 2 shows a scanning electron micrograph of a fractured surface of $Cr_2O_3$ powder compact heated at 1450° C. for 10 min. in carbon powder.

FIG. 2 shows a scanning electron micrograph of a fracture surface of the body sintered at 1400° C. for 10 min. in carbon powder. It was observed that a small amount of liquid was formed between grains.

Figure 3:
FIG. 3 shows a scanning electron micrograph of a fractured surface of $Cr_2O_3$ powder compact heated at 1450° C. for 90 min. in carbon powder.

As shown in FIG. 3, the microstructure of the body sintered at 1450° C. for 90 min. in carbon powder reveals that as the densification of the compact proceeded to the final stage of the sintering, the pores become spherical and closed.

Figure 4:
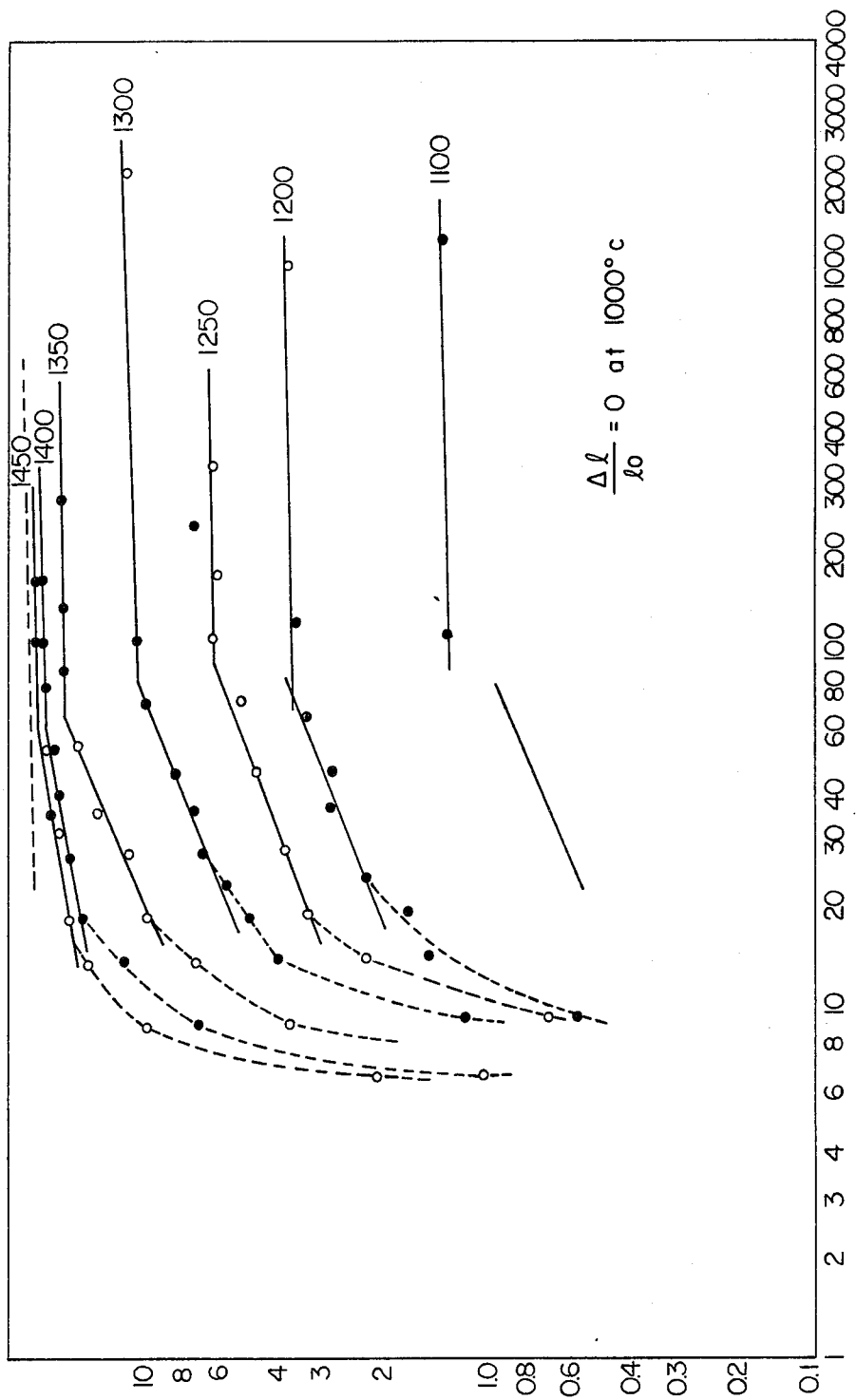
FIG. 4 shows isothermal time dependence of shrinkage of the $Cr_2O_3$ powder compacts at several temperatures.

Changes of shrinkage of the compacts sintered in carbon powder at various temperature are shown in FIG. 4 as log of $\Delta l/l_o$ versus log of time, where $l_o$ is the initial length at zero time and $\Delta l$ in the change in the compact dimension. Rapid densification occured in the initial stage of the sintering at each temperature followed by a shrinkage of very low rate, and the shrinkage nearly stopped at a certain value depending on temperature. At 1200° to 1350° C. the slope of the straight line between 20 and 80 min. is about 0.4, indicating that volume-diffusion process is rate determining step for the densification. In addition, FIG. 4 demonstrates that the shrinkage, i.e. the porosity of sintered body can be controlled by sintering temperature.

Microscopical obsevation revealed that the chromium oxide body sintered at 1500° C. for two hrs. with burying in carbon powder was composed of an aggregate of spherical $Cr_2O_3$ single crystals of 100 to 200 μm in diameter and a small amount of closed spherical pores of 1 to 3 μm in diameter.

As described above, the result of shrinkage curves and microstructural observation of the sintered bodies obviously indicated that a liquid phase is formed in the initial stage of the sintering under sintering conditions of this invention. The formation of the liquid phase at much lower temperature than the melting temperature of $Cr_2O_3$ (2265° C.) involves the existence of low-melting chromium oxide compound of Cr-O system except $Cr_2O_3$, which promotes the densification of the compact. Since the compact is heated in carbon powder, this compound may be a result of the compact being sintered at much lower equiliblium oxygen partial pressure for the reaction of $2\ C+O_2=2\ CO$ than that for $4/3\ Cr+O_2=\frac{2}{3}\ Cr_2O_3$. Accordingly, it seemes that the compound is composed of CrO or eutectic component in the system of $Cr—CR_2O_3$, $Cr—CrO$ or $CrO—Cr_2O_3$. However, no other pattern of chromium oxide except $Cr_2O_3$ was detected by X-ray diffraction data of the sintered bodies and no amorphous material was observed with polarizing microscope. Namely, it is considered that the compound could not be detected because it was probably metastable and dissociated to $Cr_2O_3$ on redeposition during the sintering or the cooling thereafter.

Heating of the compact in carbon powder caused the formation of thin layer of chromium carbide on the surface of obtained body. The thickness of the layer is about 0.1 mm for the body sintered at 1450° C. and 1500° C. for 2 hrs.

The layer prevents $Cr_2O_3$ particles in the compact from contacting directly with surrounding carbon powder to inhibit further reaction of $Cr_2O_3$ with carbon during heating. Moreover, it plays an important role in the sintering; it gives a suitable sintering atmosphere in the compact and controls the formation of the low-melting chromium oxide compound, leading to the attainment of dense sintered body with uniform microstructure.

In this experiment the thin layer of chromium carbide was formed by the reaction of carbon with $Cr_2O_3$ particles near surface of the compact. In addition, the similar effects of the layer on the densification of the compact, of course, can be expected when chromium carbide is applied to the surface of compact before heating.

Examination of curves in FIG. 1 suggests that the effects of the layer formed on the surface of compact predominate for the sintering at above 1350° C., above which the compacts are sintered to high-density bodies.

The properties of sintered body produced by the method mentioned above will be clarified in the following example 2.

EXAMPLE 2

The original $Cr_2O_3$ powder was the same as that used in example 1. The powder was pressed at 1t/cm² into rectangular compacts (30×30×70 mm). The compacts were placed in a alumina crucibles. Each crucible was filled up with carbon powder, closed with a lid, put into a furnance and heated at 1450° C. for 1.5 hrs. After heating, as thin layer of chromium carbide in thick of about 0.1 mm had been formed on the surface of obtained body, which was removed before testing. The result of measurement is shown in contrast with that of a commercial chromium oxide refractory brick in Table 1.

TABLE 1

| | sintered body of this invention | commercial chromium oxide refractory brick |
|---|---|---|
| $Cr_2O_3$ content (%) | 99.95 | 95.6 |
| Apparent porosity (%) | <0.1 | 21.5 |
| Total porosity (%) | 1.5 | 26 |
| Bulk density (g/cm³) | 5.13 | 3.80 |
| Ratio of bulk density to true density (%) | 98.5 | 74 |
| Cold crushing strength (kg/cm²) | 7,000–10,000 | 870 |
| The amount of body or brick corroded by molten boron-silicate glass at 1400° C. for 200 hrs. | 1 | 1.5 |
| The amount of vaporization in air at 1500° C. for 24 hrs. | <0.005 | 0.1 |

As shown in Table 1, the sintered body produced by a method of this invention is more dense has, better cold crushing strength yields, smaller amount of vaporization in air and has better resistance for molten glass than the commercial chromium refractory brick. Moreover, even if a compact was large such as brick, it could be sintered in common furnace by the use of a container at relatively low temperature.

It is evident that this method will considerably be lower the cost of production and make a good quality chromium oxide refractory.

In the above example, sintering of the compact was promoted by a liquid of low-melting chromium oxide compound which was formed in the $Cr_2O_3$ compact during heating. Evidently similar effect will be expected by addition of a small amount of the compound.

When a commercial sintered chromium oxide refractory brick was heated at 1500° C. for 5 hrs. in carbon powder, its quality was markedly improved. That is, slight shrinkage occured and open pores changed to closed pores because of proceeding of sintering. As a result, during use in glass furnace, infiltration of molten glass into the refractory brick was inhibited and life of the refractory can be extended. Accordingly, it was also useful to heat a commercial sintered chromium oxide refractory in the carbon powder to improve its quality.

When a chromium oxide compact is sintered by the method as described above, volume of the sintered body is reduced to about half of that of the starting compact. Sometimes such large shrinkage affects the sintering of a large compact such as refractory brick. For example, if temperature distribution in a furnace is not uniform during heating, the compact does not shrink uniformly, boundary stresses are set up and cracks tend to form. These facts result in lower strength and poor resistance to thermal stresses. In general, for the refractory brick the increased porosity leads to better thermal spalling and decrease of the thermal conductivity. Hence, it is desirable to control porosity depending on condition of use.

As described in example 1, it is possible to control porosity by sintering temperature. In addition, this invention presents a method for controlling porosity by adjusting particle size of starting $Cr_2O_3$ powder.

EXAMPLE 3

The original $Cr_2O_3$ powder was the same as that used in example 1. 500 g of the powder was put into a alumina crucible and heated in electric furnace at 1500° C. for 12 hrs. in air. During heating, the color of the powder changed from green to black. Scanning electron microscopy of the black powder revealed that range of particle size was 2.8 to 12 μm.

The black powder and the original green powder were mixed in various ratios as shown in Table 2. Each mixed powder was pressed at 1t/cm² into rectangular compacts (20×20×15 mm).

TABLE 2

| Green powder (0.2–1.0 μm) | 100 | 80 | 60 | 40 | 20 | 0 |
|---|---|---|---|---|---|---|
| Black powder (2.8–12 μm) | 0 | 20 | 40 | 60 | 80 | 100 |

Figure 5:
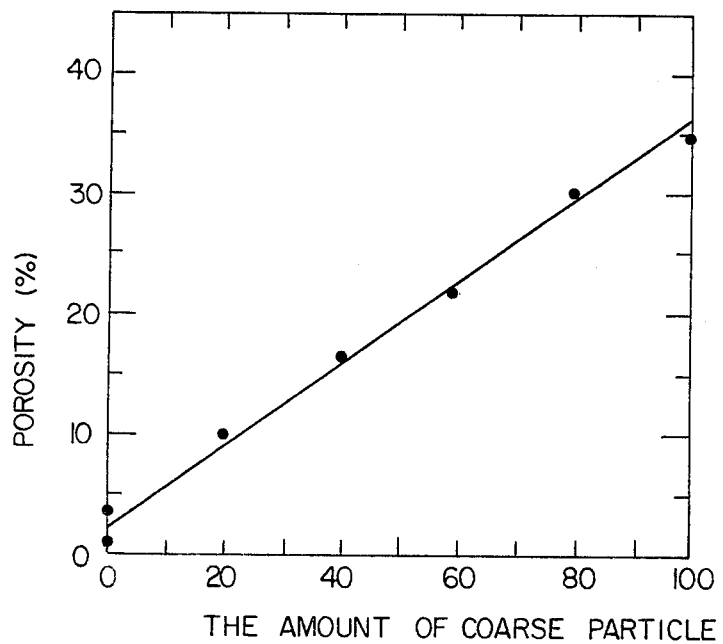
FIG. 5 shows the porosity of compacts heated at 1500° C. for 2 hrs. in carbon powder as a function of proportion of fine particles and coarse particles in starting compacts as shown in example 3.

The compacts were placed in a alumina crucibles. Each crucible was filled up with carbon powder, closed with a lid, put into a furnace and heated at 1500° C. for 2 hrs. After heating, thin layer of chromium carbide was formed on the surface of resulting bodies in a thickness of about 0.1 mm. After the layer was removed, the porosity of bodies was measured. As shown in FIG. 5, the porosity increased in proportion to the amount of the black power in starting powder and attained to 35% in the case of the black powder only.

Consequently, if ratio of these powders is controlled, the porosity of the sintered body can be controlled in range below 35%.

In case of the black powder, no shrinkage occured even in the compact sintered at 1500° C. for 12 hrs., however in the case of the green powder, rapid shrinkage occured and prevented sintering of the compact to a void-free body. Accordingly, if particle size in starting powder was controlled, it was possible to control shrinkage rate and to obtain a full dense and void-free body as in the following example.

EXAMPLE 4

Figure 6:
FIG. 6 shows a scanning electron micrograph of the body obtained by heating the powder compact, of which particle size range is 1.5–8.6 μm, at 1500° C. for 6 hrs.

The original $Cr_2O_3$ powder was the same as that used in example 1. The powder was heated in air at 1500° C. for one hour. The resulting powder is dark green and composed of particles of 1.5–8.6 μm in size range (3.7 μm in average). The powder was pressed at 1t/cm² into rectangular compacts (20×20×15 mm). The compacts were placed in alumina crucibles. Each crucible was filled up with carbon powder, closed with a lid, put into a furnace and heated at 1500° C. for 6 hrs. The obtained body contained no porosity and its bulk density was almost theoretical value. FIG. 6 shows a scanning electron micrograph of a fractured surface of the body. Fracture occured mostly through grains. No abnormal grain growth and no pores were observed, and the range of grain size was 10 to 25.

When fine particles are heated in air above 1000° C., they grow as shown in following example. Therefore, it is convenient to heat the original fine particles in air to obtain desired coarse particles.

EXAMPLE 5

The $Cr_2O_3$ powder used in example 1, of which particle size was 0.2 to 1.0 μm and 0.5 μm in average, was used. The powder was put into alumina crucible and heated in air at various temperature for various time. The result is shown in Table 3.

TABLE 3

| heating temperature (°C.) | heating time (hr.) | color of powder | particle size (μm) |
|---|---|---|---|
| 1200 | 2 | deep green | 0.5–1.3 |
| 1250 | 2 | deep green | 0.6–1.6 |
| 1350 | 2 | deep green | 0.6–2.1 |
| 1450 | 2 | black green | 1.4–5.8 |
| 1500 | 1 | black green | 1.8–8.6 |
| 1500 | 3 | black | 2.0–9.3 |
| 1500 | 12 | black | 2.8–12.0 |
| 1500 | 50 | black | 4.7–13.8 |

There was nothing changed below 1100° C., while above 1200° C. the particles grew extensively and particles of about 20 μm appeared in the powder heated at 1500° C. for 50 hrs.

Figure 7:
FIG. 7 shows a scanning electron micrograph of commercial $Cr_2O_3$ powder heated at 1500° C. for 12 hrs. in air.

FIG. 7 shows a scanning electro micrograph of the powder heated at 1500° C. for 12 hrs. in air.

As described above, the particle size can be controlled by heating temperature and time. Moreover, crushing process was unnecessary after heating, since powder was hardly sintered during heating in air. Therefore, it seems that coarse particles can be obtained without intermixing of impurity and the cost of production becomes lower.

Structural uniformity of the sintered body produced by the method of this invention will be described as the following.

When a large compact such as refractory brick is heated, it is possible that some difference in sintering state tends to arise between part of near surface and the inner portion of the compact. As a result, shrinkage rate of the compact and the microstructure of obtained body are not always uniform in all parts. In addition, abnormal grain growth of $Cr_2O_3$ may also occur. Such facts reduce the mechanical strength of the body by introducing excessive local stress and crack.

This invention presents a method for improving the drawbacks as described above.

EXAMPLE 6

Figure 8:
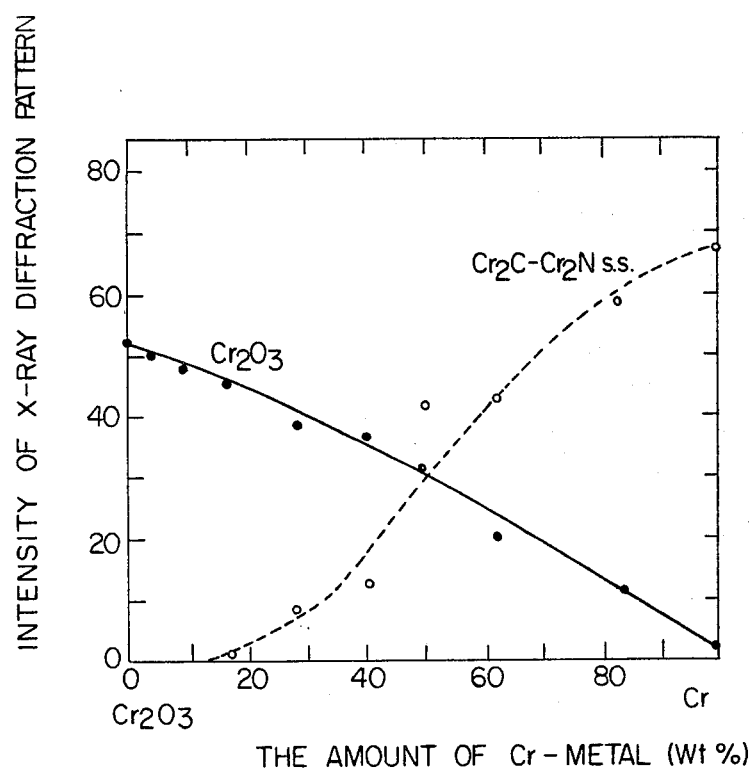
FIG. 8 shows patterns of intensity of X-ray diffraction compounds formed in the bodies sintered in carbon powder as a function of proportion of the amount of Cr metal in the starting compacts.

The original $Cr_2O_3$ powder was the same as that used in example 1. Cr-metal powder was mixed with the $Cr_2O_3$ powder in ratio as shown in FIG. 8. Each mixed powder was pressed at 800 kg/cm² into rectangular compacts (20×20×15 mm). The compacts were placed in alumina crucibles. Each crucible was filled up with carbon powder, closed with a lid, put into a furnace and heated at 1500° C. for 4 hrs. in air. After heating, a thin layer of chromium carbide was formed on the surface of obtained bodies which was removed from the bodies before testing. The porosity of bodies was 0.5 to 4%.

Electron microscopy of the fractured surface of bodies revealed that grain size was relatively uniform and pores which were in the grains were closed and spherical. X-ray diffraction data indicated that the sintered bodies made of the compacts containing more than about 10% Cr were composed of $Cr_2O_3$ and $Cr_2C$—$Cr_2N$ solid solution.

FIG. 8 shows intensity of X-ray diffraction pattern of $Cr_2O_3$ and $Cr_2C$—$Cr_2N$ solid solution formed in the sintered bodies as a function of the amount of Cr in the starting compacts. Cr was not contained in all the sintered bodies.

These bodies to be tested were pulverized. Weight change of each pulverized sample was measured at heating rate of 350° C./h till 1400° C. with thermobalance. Weight of the sample made of a compact containing less than 5% Cr did not change, but that of a compact containing 7% and 10% Cr increased by the amount of 0.5% and 1.2%, respectively.

Accordingly, it is desirable for a body used at oxidizing atmosphere to be made of a compact containing below 5% Cr metal.

Figure 9:
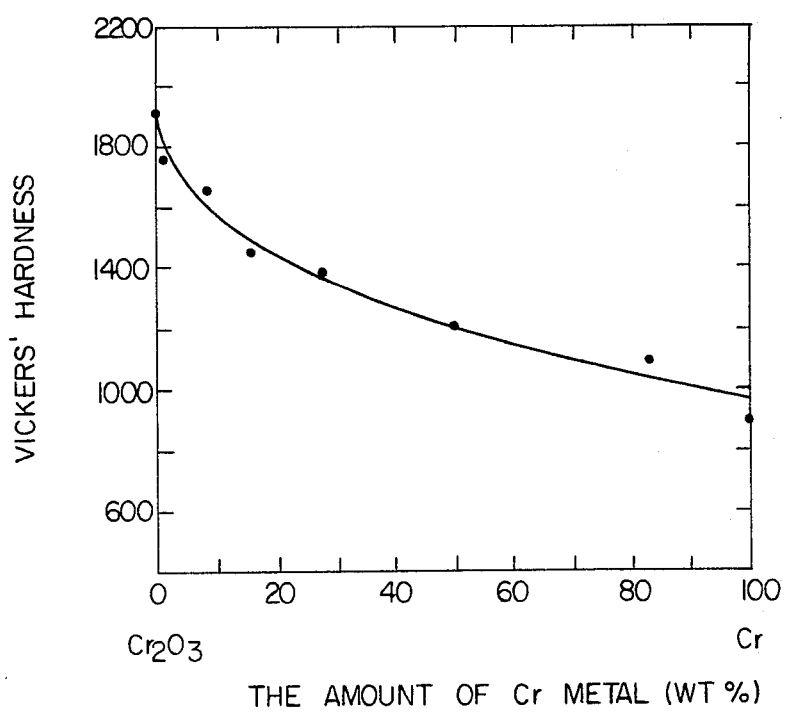
FIG. 9 shows Vickers' hardness of the bodies sintered in carbon powder as a function of proportion of the amount of Cr metal in the starting compacts.

In addition, since Vickers' hardness of the sintered bodies are very high as shown in FIG. 9, the bodies can be used as material for tool, thread guide, etc.

The effect of Cr-metal on the sintering of a chromium oxide compact will be explained in the following example 7.

EXAMPLE 7

The original $Cr_2O_3$ powder was the same as that used in example 1, Cr-metal powder was added to the $Cr_2O_3$ powder. The amounts of Cr-metal added are 0.5, 1.0 and 3 wt%.

Each mixed powder was pressed at 1t/cm² into rectangular compacts (10×10×5 cm). The compacts were placed in SiC container. The container was filled up with carbon powder and heated at 1500° C. for 3 hrs. When the compacts with Cr-metal were sintered, all the obtained bodies had no crack, but some cracks was formed in the body made of $Cr_2O_3$ only.

This fact is very significant from a practical standpoint.

It seemed that, when the compact with Cr-metal was heated, the Cr-metal reacted with gas in pores to form a liquid of low-melting chromium oxide compound and a $Cr_2C$—$Cr_2N$ solid solution. It was possible that in early sintering stage, fine grains dissolved in the liquid and the dissolving material was redeposited on the larger grains as $Cr_2O_3$. At the same time the formed $Cr_2C$—$Cr_2N$ solid solution inhibited abnormal grain growth of $Cr_2O_3$. Since density of the liquid was lower than that of Cr-metal, the liquid contributed to fill up of pores, i.e., to decrease the shrinkage percentage. In addition, as the Cr-metal powder was uniformly distributed in the compact, it could be uniformly densified to more than 98% of theoretical without forming cracks.

As described above, Cr-metal powder is effective for sintering of $Cr_2O_3$. In practice, the sintering method of mixing with Cr-metal powder is very useful for producing the sintered chromium oxide body.

Although the invention has been described on the base of some examples, as many appearently widely different embodiments of this invention may be made without departing from the spirit and scope thereof, it is to be understood that the invention is not limited to be specific embodiments thereof expect as defined in the appended claims.

What I claim is:

1. A method of producing a sintered body consisting substantially of $Cr_2O_3$ within 2% of theoretical density and having a porosity of 1 to 35 percent comprising:
    pressing $Cr_2O_3$ powder to form a compact;
    placing said compact into a closed container with said compact surrounded by carbon powder; and
    heating the carbon-surrounded compact at a sintering temperature of above 1200° C.

2. The method according to claim 1 further comprising:
    controlling the porosity of the ultimate sintered body by controlling the sintering temperature.

3. The method according to claim 1 further comprising controlling the porosity of the ultimate sintered body by initially adjusting the proportion of coarse particles and fine particles in said $Cr_2O_3$ powder.

4. The method of claim 3 wherein said coarse particles are obtained by heating fine particles above 1200° C. in air.

5. The method of claim 1, claim 2, claim 3 or claim 4 wherein Cr-metal powder is initially mixed into said $Cr_2O_3$ powder.

* * * * *